Patented Sept. 12, 1922.

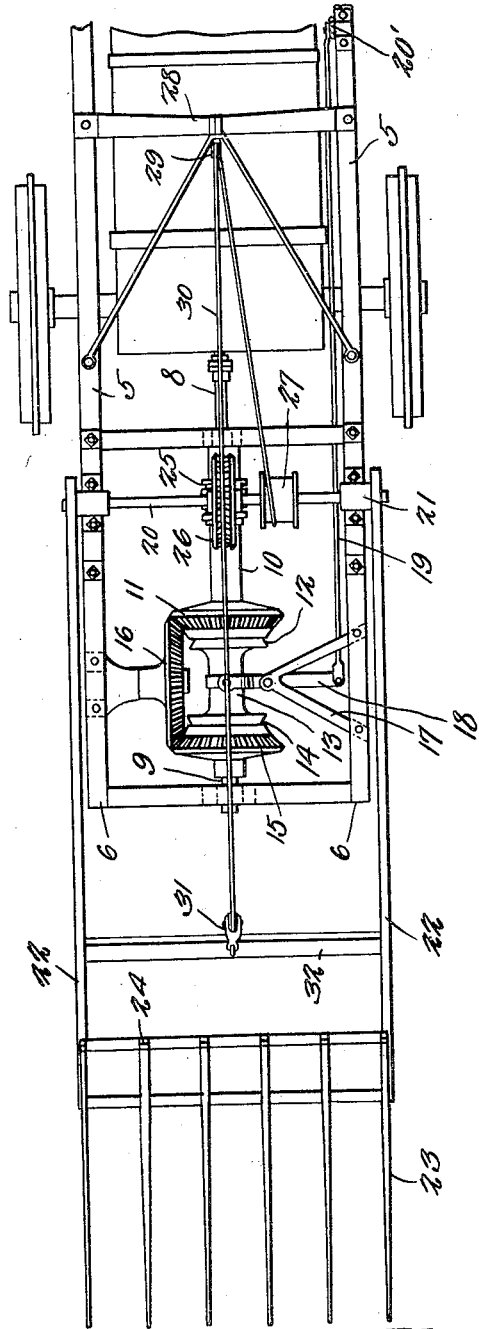

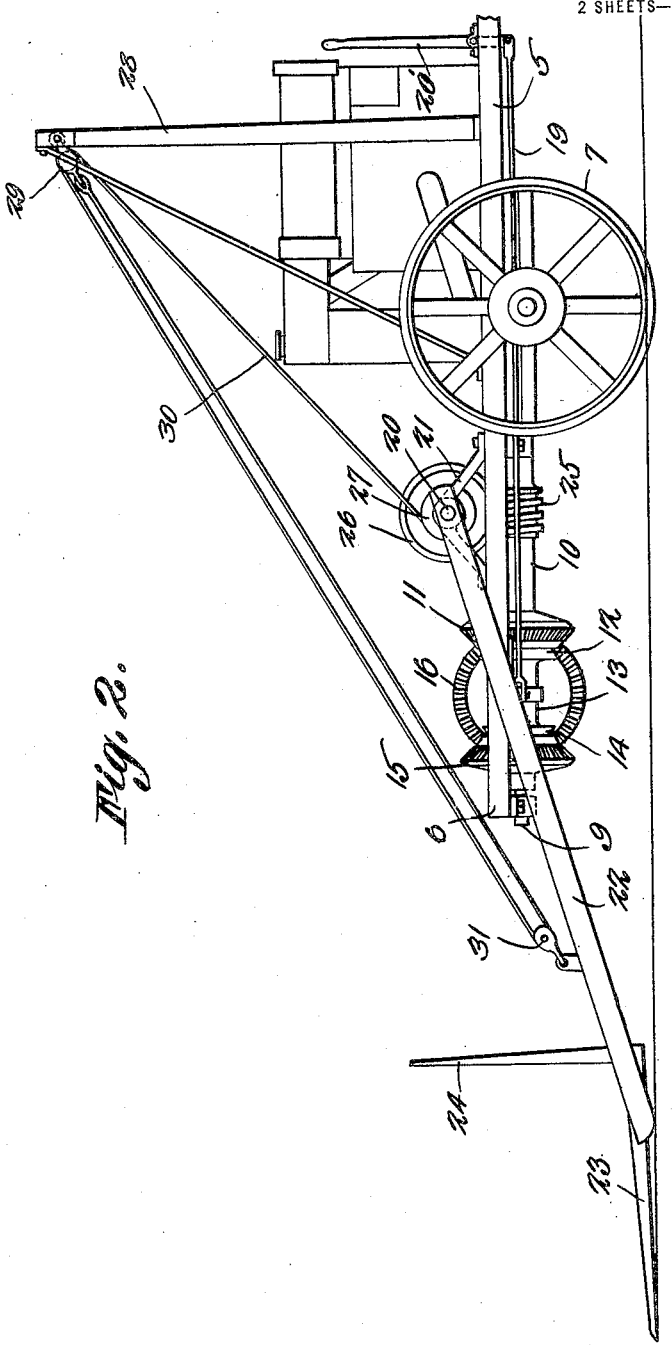

1,429,032

UNITED STATES PATENT OFFICE.

THOMAS R. HARRINGTON, OF PLATTE CITY, MISSOURI.

SHOCK LOADER.

Application filed October 25, 1921. Serial No. 510,189.

*To all whom it may concern:*

Be it known that I, THOMAS R. HARRINGTON, a citizen of the United States, residing at Platte City, in the county of Platte and State of Missouri, have invented a new and useful Shock Loader, of which the following is a specification.

This invention relates to loading devices to be used in connection with hay wagons or the like for loading hay or the like onto a wagon, while the wagon is being moved through a field.

The primary object of the invention is to provide a loading device to be applied to a tractor at the front end thereof, the tractor at the same time providing the power means for moving the hay wagon.

Another object of the invention is to provide a loading fork designed to move upwardly over the tractor and deposit material in a wagon hitched to the rear of the tractor.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a plan view of a tractor and loading device, the loading device being connected thereto.

Figure 2 is a side elevational view of the same.

Referring to the drawings in detail, the reference character 5 designates the side rails of the tractor to which are applied the side rails 6 of the loading device, the connection between the side rails of the tractor and the side rails of the loading device being made in any suitable and well known manner.

The tractor is of the usual construction, and embodies the supporting wheels 7 and drive shaft 8 which extends forwardly and has connection with the shaft 9 that is supported by the loading device.

Mounted on the shaft 8 is a hollow shaft 10 that carries the beveled pinion 11, the hollow shaft being free to rotate on the shaft 8. One surface of the beveled pinion 11 is provided with a clutch face, to cooperate with the clutch face 12 of the sliding clutch member 13, which has a clutch face 14 formed at the opposite end thereof, the clutch face 14 being designed to move into engagement with a suitable clutch face formed on the beveled pinion 15 mounted on the shaft 9 and which is free to revolve thereon.

An idle pinion 16 is supported by the loading device and is in mesh with the pinions 11 and 15 at all times, so that reverse movement of the hollow shaft 10 may be accomplished at the will of an operator, in a manner to be hereinafter more fully described. Bracket members 17 are carried by one of the side rails of the loading device and provide means for supporting the clutch operating arm 18, it being understood that the clutch member is splined on the shaft 9.

Having connection with the arm 18 is a controlling rod 19 which has connection with the operating lever 20' disposed in proximity to the operator's seat so that the operator will have easy access thereto to accomplish the moving of the clutch mechanism.

Extending transversely of the loading frame is a shaft 20 mounted in bearings 21, the ends of the shaft extending beyond the side rails 6 and providing supports for the side bars 22 of the loading arm which pivots at its point of connection with the shaft 20 and may be moved upwardly to a position to overlie the tractor. At the forward ends of the bars 22 is a forked member 23 which has guarding fingers 24 arranged at the rear thereof, the guarding fingers 24 acting to prevent the material picked up by the fork 23, from falling from the fork on its movement to the rear of the loading device.

The shaft 10 is provided with a worm gear 25 which is constantly in mesh with the pinion 26 mounted on the shaft 20, which pinion 26 receives rotary motion from the worm gear 25 to rotate the shaft 20 to accomplish the rotation of the drum 27 which is also mounted on the shaft 20.

Supported by the tractor is a vertical frame 28 to which is secured a pulley 29 over which operates the flexible member 30 that has one end secured to the drum 27. This flexible member 30 also moves over the pulley 31 carried by the cross beam 32 that connects the rails 22 of the loading arm. Thus it will be seen that as the drum 27 is rotated, in one direction, the flexible member is wound thereon and the loading arm is moved upwardly. With the reverse movement of the drum, the loading arm is returned to its normal position as indicated by Figure 2 of the drawings.

In the operation of the device, assuming that the loading arm is in a position as indicated by Figure 2 of the drawings, and it is desired to raise the same to discharge material which has been picked up by the fork 23, the lever 20' is operated to move the clutch member 13 into direct engagement with the pinion 11, whereupon the shaft 10 is moved in one direction to cause the drum 27 to wind the flexible member thereon. After the loading arm has been moved to a position over the tractor and discharges its load into a wagon, hitched to the rear of the tractor, the lever then is moved in the opposite direction to clutch the pinion 15 to the drive shaft, whereupon rotary movement is imparted to the pinion 11 through the pinion 16, with the result that the drum 27 is rotated in the opposite direction to unwind the flexible member and permit the loading arm to fall to its normal position.

It might be further stated that the loading device is moved along a field, the fork 23 being forced into a shock of grain, or hay to be loaded, and the mechanism operated as described.

Having thus described the invention, what is claimed as new is:—

1. In combination with a tractor and the drive shaft thereof, a loading device including a frame, a shaft on the frame and connected with the drive shaft of the tractor to receive motion therefrom, a transversely extending shaft on the frame, means for transmitting motion from the drive shaft to the transversely extending shaft, a pivoted loading arm carried by the frame, a drum on the transversely extending shaft, and a flexible member operating over the drum and having connection with the pivoted loading arm for moving the same.

2. In combination with the tractor and a drive shaft thereof, a loading device including a frame, a drive shaft supported by the frame and having connection with the drive shaft of the tractor, a transversely extending drum supporting shaft on the frame, means for transmitting motion to the shaft, a pivoted loading arm having a fork at one end thereof, and a flexible member operating over the drum for moving the loading arm.

In testimony that I claim the foregoing as my own, I have hereto affixed my signature in the presence of two witnesses.

THOMAS R. HARRINGTON.

Witnesses:
A. J. HIGGINS,
GUY COLMAN.